United States Patent [19]

Kliman

[11] Patent Number: 5,159,220
[45] Date of Patent: Oct. 27, 1992

[54] REALIZATIONS OF FOLDED MAGNET AC MOTORS

[75] Inventor: Gerald B. Kliman, Schenectady, N.Y.

[73] Assignee: General Electric Company, Schenectady, N.Y.

[21] Appl. No.: 542,870

[22] Filed: Jun. 25, 1990

[51] Int. Cl.[5] ............................................. H02K 21/12
[52] U.S. Cl. ...................................... 310/156; 310/42; 310/43; 310/218; 310/261; 310/271
[58] Field of Search ............... 310/152, 156, 261, 264, 310/265, 214, 215, 216, 217, 218, 91, 42, 43, 181, 271; 29/598

[56] References Cited

U.S. PATENT DOCUMENTS

| | | | |
|---|---|---|---|
| 3,840,763 | 10/1974 | Baumann et al. | 310/156 |
| 4,302,693 | 11/1981 | Burgmeier | 310/156 |
| 4,388,545 | 6/1983 | Honsinger et al. | 310/156 |
| 4,464,596 | 8/1984 | Miller | 310/156 |
| 4,476,408 | 10/1984 | Honsinger | 310/156 |
| 4,486,679 | 12/1984 | Jones | 310/42 |
| 4,709,179 | 11/1987 | Banon | 310/156 |
| 4,742,259 | 5/1988 | Schaefer | 310/156 |
| 4,806,717 | 2/1989 | Hershberger | 310/261 UX |
| 4,916,346 | 4/1990 | Kliman | 310/216 |
| 4,918,831 | 4/1990 | Kliman | 29/598 |

FOREIGN PATENT DOCUMENTS 0133879 1/1979 German Democratic Rep. .................... 310/156

OTHER PUBLICATIONS

K. J. Binns et al.; "Hybrid Permanent-Magnet Synchronous Motors"; Mar. 1978; Proc. IEE, vol. 125, No. 3, pp. 203-208.

F. E. Rogers et al.; "Discussion on Segmented-Rotor Disc Motor and Reversing Shaded-Pole Motor with Effective Ring Shift and Hybrid Permanent-Magnet Synchronous Motors"; Nov., 1979; Proc. IEE, vol. 126, No. 11, p. 1196.

V. B. Honsinger; "Permanent Magnet Machines"; Jul.-/Aug., 1980; IEE Transactions on Power Apparatus and Systems, vol. PAS-99. No. 4, pp. 1503-1509.

V. B. Honsinger; "Performance of Polyphase Permanent Magnet Machines"; Jul./Aug. 1980; IEE Transactions on Power Apparatus and Systems, vol. PAS-99, No. 4, pp. 1510-1518.

V. B. Honsinger; "The Fields and Parameters of Interior Type AC Permanent Magnet Machines"; Apr. 1982; IEE Transactions on Power Apparatus and Systems, vol. PAS-101, No. 4, pp. 867-875.

Primary Examiner—R. Skudy
Attorney, Agent, or Firm—Marvin Snyder; James C. Davis, Jr.

[57] ABSTRACT

A rotor assembly for an internal permanent magnet rotor comprises a plurality of interior laminations stacked to form a substantially continuous internal core and a plurality of external laminations stacked to form a substantially continuous external core. A plurality of permanent magnets are positioned between the internal and external cores and folded in the radial plane so as to form a substantially W-shaped arrangement. The magnets may be placed in slots formed through the stacked laminations between the internal and external core sections or the internal and external core sections may be formed as two separate units with the magnets sandwiched therebetween. The core laminations may be strengthened by using nonmagnetic inserts in selected positions which can be welded to the magnetic portions of the laminations. The outer core portion, when separate from the inner core portion, may be held against the inner core portion by bolts through the outer core portion or by a sleeve around the rotor assembly.

29 Claims, 7 Drawing Sheets

REALIZATIONS OF FOLDED MAGNET AC MOTORS

This invention relates to interior permanent magnet motors and, more particularly, to a rotor assembly for such motors.

BACKGROUND OF THE INVENTION

Interior permanent magnet machines are typically constructed with rotors formed of a stack of disk laminations, with each of the laminations having a plurality of pole piece sections connected to one another by circumferential bridges situated at the disk periphery. The pole piece sections and the interior core portion of the laminations define the radial thickness of magnet slots formed in the laminations. Radial ligaments on each disk connect the interior portions of the disk laminations to the circumferential bridges. The disk laminations are stacked so that the magnet slots extend through the stack in an axial direction when the laminations are assembled on a motor shaft. The magnets are placed in the magnet slots and may be held in place by plastically deforming the bridges and ligaments to create a predetermined hoop stress to hold the magnets in their respective slots when the pressing force is removed. Since the bridges are relatively thin in order to minimize the amount of magnetic flux required to saturate them to assure proper operation of the motor, and since the bridges are of the same magnetic material as the rest of the rotor, their tensile strength is low and limits the maximum operating speed of the rotor. One method of increasing the strength of the rotor is to remove a portion of the low strength material of the laminations and replace that material with higher strength non-magnetic segments. These segments may be positioned at the intersection of the bridges and the radial ligaments and may be welded to both the bridges and ligaments. Alternatively, the segments may be welded to only the bridges so as to form an outer ring which may be shrunk fit over the assembled interior portion of the laminations and magnets. Since the inserts may be formed of a higher strength material than the laminations, the strength of each lamination is increased thus increasing the maximum speed capability of the rotor. A description of a system employing such inserts is shown in U.S. Pat. No. 4,916,346 assigned to the assignee of the present invention.

As the development of interior permanent magnet machines has progressed, the need for machines capable of developing higher torque and horsepower has grown. In order to generate the increased horsepower, it is necessary to increase the amount of flux in such machines while at the same time it is desirable to minimize the size of the machines.

For a given magnet energy, there appears to be an upper limit on motor torque and horsepower in a given frame size when magnets of simple configuration are used. The available motor torque and horsepower may be increased by use of flux multiplication techniques. One method is to use circumferential flux magnets, but this is only effective for pole numbers higher than four which, in turn, requires increased drive frequency. Use of circumferential flux magnets, however, is not always feasible due to electronic device limitations. Flux multiplication may be achieved in low pole number motors by folding the magnet, and such schemes have been proposed, but it is believed that they have not been implemented due to their mechanical complexity. In addition, prior development of folded magnet rotors has been directed at small (25 HP and under) motors which undergo relatively low mechanical stress and thus allow simple implementations. Current interest is now in the 300 HP and higher range, at high mechanical stress.

Folded magnets have been used in the stator poles of low horsepower direct current (DC) motors. U.S. Pat. No. 3,840,763, assigned to the assignee of the present invention, describes the use of folded magnets for alternating current (AC) motors and discloses a proposed V-shaped magnet arrangement and a two-pole, spiral pole arrangement having low stress. U.S. Pat. No. 4,388,545, also assigned to the assignee of the present invention, describes various "cup" and circumferential configurations intended to increase the magnetic flux for application in small motors.

SUMMARY OF THE INVENTION

It is an object of the present invention to provide a method and apparatus for implementing an interior permanent magnet rotor which overcomes the above and other disadvantages of the prior art.

It is another object of the present invention to utilize the effect of higher energy magnet materials to increase motor torque and horsepower within a given motor frame size.

The above and other objects are attained in an interior permanent magnet rotor for a dynamoelectric machine which incorporates a plurality of permanent magnets mounted within the rotor for establishing a preselected number of magnetic poles, with the permanent magnets being arranged in a folded orientation having a W-shaped cross section. Each of the magnetic poles encompasses a preselected sector of the rotor, with edges of each sector lying on a radius line of the rotor. At least two of the magnets are positioned in the sector such that one lies parallel to one of the radius lines on one edge of the sector and the other lies parallel to a radius line on another edge of the sector. Two other magnets are arranged such that their edges lie adjacent radially inner edges of corresponding ones of the first two magnets and their radially outer edges lie adjacent each other. The magnets are arranged so that the magnetic pole has a net magnetic force of a preselected polarity. In one form, the magnets are positioned in axially-extending slots within the rotor. The slots are larger than the magnets to accommodate dimensional variations. The magnets are held firmly in place in one form by filling the spaces between the sides of the slots and the magnets with a potting compound having non-magnetic properties. The potting compound may comprise an epoxy or a nonmagnetic metal such as aluminum. In another form, the magnets are held in place by wavy springs inserted between the magnets and adjacent sides of the slots. In each form, space is provided at the edges of the magnets to prevent short circuits between north and south poles of the magnets.

In another form of the invention, the rotor is constructed of a plurality of stacked laminations forming an inner core section and an outer core section. The inner core section may be independent of the outer core section and stacked on a shaft of the dynamoelectric machine. The magnets are abutted against the inner core section and may be held in place by glue or clamping. The outer core sections are then abutted against the magnets and an outer ring positioned about the rotor assembly to hold the magnets and outer core sections in position on the rotor.

In still another form of the invention, the magnetic flux may be increased by increasing the lengths of the magnets by mitering the edges so that they can be either abutted or spaced by only a small amount, thereby increasing the amount of magnet in the rotor. In the embodiment wherein the edges are abutted, the outer core section may be attached to the rotor in the manner described above. When the edges are not abutting, the laminations may be formed with ligaments connecting the inner core section and the outer core section so as to form slots into which the magnets are positioned. Where a strength higher than that of the magnetic material laminations is required for bridges and ligaments, composite laminations can be constructed using non-magnetic material having greater strength than the magnetic material of the laminations. The nonmagnetic material may be welded to the magnetic material of the laminations. In the embodiment wherein the magnets are positioned in slots, the magnets may alternatively be held in place by inserting wavy springs between the magnets and adjacent surfaces of the slots formed by the stacked laminations.

In still another form of the invention, the outer core sections may be attached to the inner core sections by bolts extending from each outer core section to an inner core section. In this form, it may be preferable to include a radially inner sleeve of a solid material which can be threaded to accept the bolts. It may also be desirable in this form to provide grooves in the magnets for passing the bolts therethrough rather than increasing the spacing between the magnets. The use of bolts may require use of inserts positioned in slots in the radially outer surface of the outer core portion for supporting the bolts for spreading the force exerted by the bolt-heads against the outer core portions. Any of the above constructions may be adapted for a line start motor by positioning an array of slots about the outer periphery of the rotor core and filling the slots with a nonmagnetic electrically conducting material. The slots of this array extend axially through the stacked rotor laminations to form a rotor cage.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
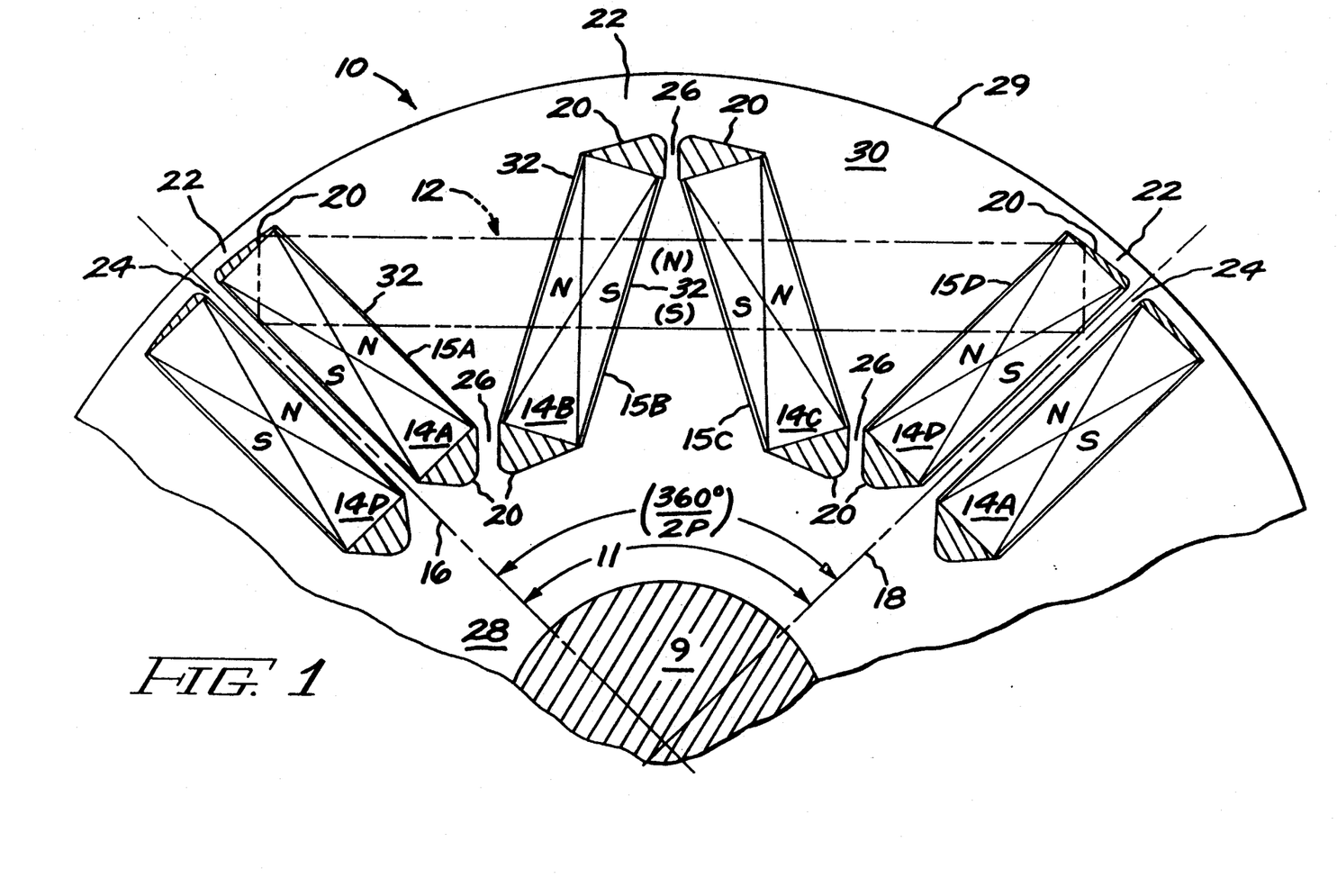
FIG. 1 is a simplified cross-sectional view of one pole of a four-pole rotor of a dynamoelectric machine illustrating an arrangement of interior permanent magnets in accordance with the teaching of the present invention.

FIG. 1 is a simplified cross section of a portion of a rotor 10 which is suitable for use in a four-pole interior permanent magnet (IPM) motor. Only one-fourth of the entire rotor (one pole) is shown, approximately in proper proportions for the size of motors under consideration, i.e. 300 HP and up. Although a four-pole rotor (i.e., one employing two pairs of poles) has been selected for illustration, the following discussion is equally applicable to 2, 6, and in principle) other pole numbers as well. The angular extent of the magnetic pole 11 can be determined from 360/2P, where P is the number of pole pairs. Magnets 14A-14D, which are arranged to collectively comprise a folded magnet in the shape of a "W", are shown in solid lines with a conventional, simple form, radial flux magnet 12 of the same thickness shown in dashed lines for comparison purposes. Magnets 14A-14D are located in respective axial slots 15A-15D in the stacked laminations forming rotor 10. The theoretical multiplication of flux produced by the proportions shown is 1.35, which is due to the necessity of making room for the thickness of magnets 14A-14D. An important factor is the arrangement of magnets 14A-14D near the line of symmetry or rotor radius lines 16, 18. This arrangement is believed to provide optimum magnet utilization. The prior art has generally assumed, since it is not an issue in the DC motor, that there would be many magnet folds in an AC motor more or less centered on the main pole, with space left over at the edges of the pole. In actuality, the number of folds shown, i.e., the "W-shape" of FIG. 1, is about the practical limit. In both the high pole number circumferential flux multipliers and in the folded magnet configuration, the angle between magnets is limited by saturation of the steel and increasing leakage flux. Saturation and leakage will, in fact, reduce the theoretical multiplier cited above even for the proportions shown.

The attainable magnetic flux multiplication results from trade-off of the various elements of the design. The effect of magnet thickness has already been mentioned. The amount of space required to carry quadrature flux radially outward of the magnets limits the length of the magnets in the outer portion of the rotor while both the required flux path and mechanical assembly stresses limit the radially inward extent of the magnets in the inner portion of the rotor. To gain the greatest possible flux multiplication, the central magnets 14B, 14C of the "W" configuration in each pole may be extended to near the rotor periphery, leaving only a thin bridge to carry hoop stresses. This will also have the effect of introducing a "flux barrier" into the quadrature axis, making the motor seem more like a surface magnet motor than an IPM motor. The gain in open circuit voltage must then be evaluated against the loss of reluctance torque. In principle, the thickness of the folded flux magnet must be increased to supply the additional magnetomotive force (mmf) required to drive the air gap between the rotor and armature at the higher flux density.

The implementation shown in FIG. 1 assumes that the magnets are used in the form of rectangular prisms (hexahedrons), which is the most convenient and economical form. As shown, spaces 20 (or nonmagnetic material) must be provided at the ends of the magnets 14A–14D to prevent excessive leakage fluxes from drawing away the useful flux of the magnets. Since magnets are typically brittle, they cannot be used to carry any tensile stress and can absorb only limited compressive stress (about 7 kilopounds per square inch). Hence some other means are required to hold rotor 10 together against centrifugal and assembly stresses. In the embodiment shown in FIG. 1, saturating circumferential bridges 22 at the periphery carry hoop stress, and are saturated by magnets 14A–14D in a manner similar to a conventional IPM motor. An unsaturated radial ligament 24 separates the two adjacent sector magnets 14A, 14D in a manner both mechanically and magnetically different from the conventional IPM. Radial ligament 24 also serves to carry flux from one magnet to another and to locate the position of the magnet. Additional saturated radial ligaments 26 are used to hold the inside and outside portions 28, 30 of each rotor lamination 29 together and to carry centrifugal forces due to the mass of the outer portion and the magnets. Both the mechanical and magnetic functions of the ligaments differ from those in a conventional IPM motor. An aperture in inside portions 30 of the rotor laminations accommodates the motor shaft 9.

Figure 2:
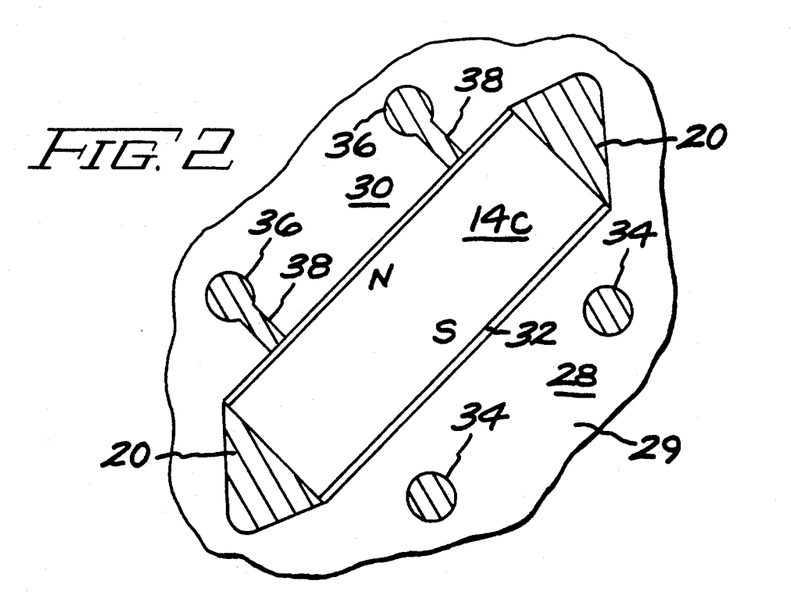
FIG. 2 is an illustration of a single one of the magnets of FIG. 1 showing the use of axially-extending apertures adjacent the magnet for bonding the stacked laminations and for flux control.
Figure 3:
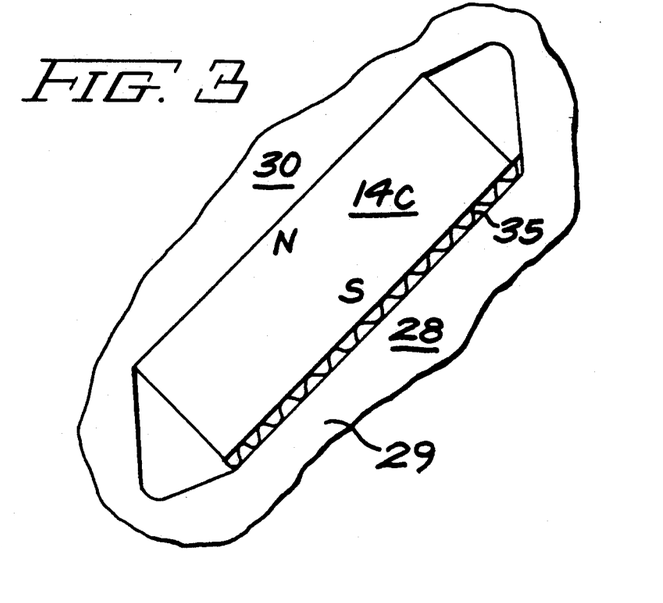
FIG. 3 is an illustration of a single one of the magnets of FIG. 1 showing an alternative method of holding a magnet in place within a slot through the rotor using a flat wavy spring.

The form of rotor shown in FIG. 1 is most suitable for casting, using a potting compound such as aluminum, plastic, or epoxy to hold the assembly together. In the casting process, the potting compound flows through open spaces 20 at the ends of magnets 14A–14D and also fills in the tolerance spaces 32 between the pole faces of each magnet and the inside surface of the slot formed by the stacked laminations and containing the respective magnet. To enhance longitudinal strength and to balance casting forces, additional holes 34, 36 (see FIG. 2) in the laminations 29 may be required both circumferentially inboard and outboard, respectively, of magnets 14A–14D. Circumferentially outboard holes 36 have passages 38 to the magnets, such as magnet 14C shown in FIG. 2, to prevent coupling with Q axis fluxes in electronic drives, although such coupling may be desirable in "line start" motors (i.e., motors that are energized directly from a fixed frequency source) or in current source drives. Such passages 38 have the additional benefit of enhancing the flow of casting material around magnet 14A–14D to aid in locking them in place. If rotor 10 is constructed with ferrite magnets, the potting compound may be molten aluminum, since the heat will not harm the magnets and magnetization after assembly is feasible. Cobalt-samarium magnets may also be cast with aluminum, but magnetization after assembly is more difficult. Neodymium-iron magnets may be damaged by hot aluminum, but are easier to magnetize after assembly. Since the aluminum potting compound serves no electromagnetic function, lower temperature materials such as plastics or epoxies may be used to fill spaces 20, 32 to support the magnets and allow the use of premagnetized magnets.

Where casting or potting is not desirable, other techniques can be used to wedge magnets 14A–14D firmly in place in their respective slots 15A–15D against centrifugal and other loads imposed by the operating environment. Longitudinal (axial) loads are easily handled by end plates (not shown) in a manner well known in the art. Other loads must be handled by wedges inserted between the magnet surface and an adjacent surface of the slot through the stacked laminations. Such wedging is necessary since there must be clearance between the magnets and the laminations to allow assembly, as the magnets themselves will have a tolerance (normally several mils) as do the slots punched in the laminations. In addition, it is usually not possible to stack laminations without a certain amount of "stagger"; that is, the laminations do not precisely line up and hence require an additional several mils of clearance space. A preferred wedging technique uses flat springs or, more precisely, "wavy" springs 35 as shown in FIG. 3. These wavy springs are formed of a metal having shape memory and can be inserted as ductile flat sheets at low temperature, becoming stiff wavy springs at normal room temperature. An example of such metal is Nitinol nickel-titanium alloy, available from Innovative Technology International, Inc., Beltsville, Md. Brass may alternatively be used, and the fact that brass requires installation at liquid nitrogen temperatures may be additionally advantageous in preventing loosening at operating temperature. The brass wavy spring is formed using standard industry practices. After being dipped in liquid nitrogen to cool below a critical temperature, the brass spring can be flattened for insertion in the rotor. After the spring has been inserted in the rotor and its temperature has risen sufficiently (i.e., to room temperature), it returns to its wavy shape. Another option is to separate the rotor lengthwise into one- or two-inch packages, assemble it onto an intermediate carrier, and then transfer it onto a main shaft to form the full rotor. This option allows use of standard wedges in each of the shorter length rotor packages.

Figure 4:
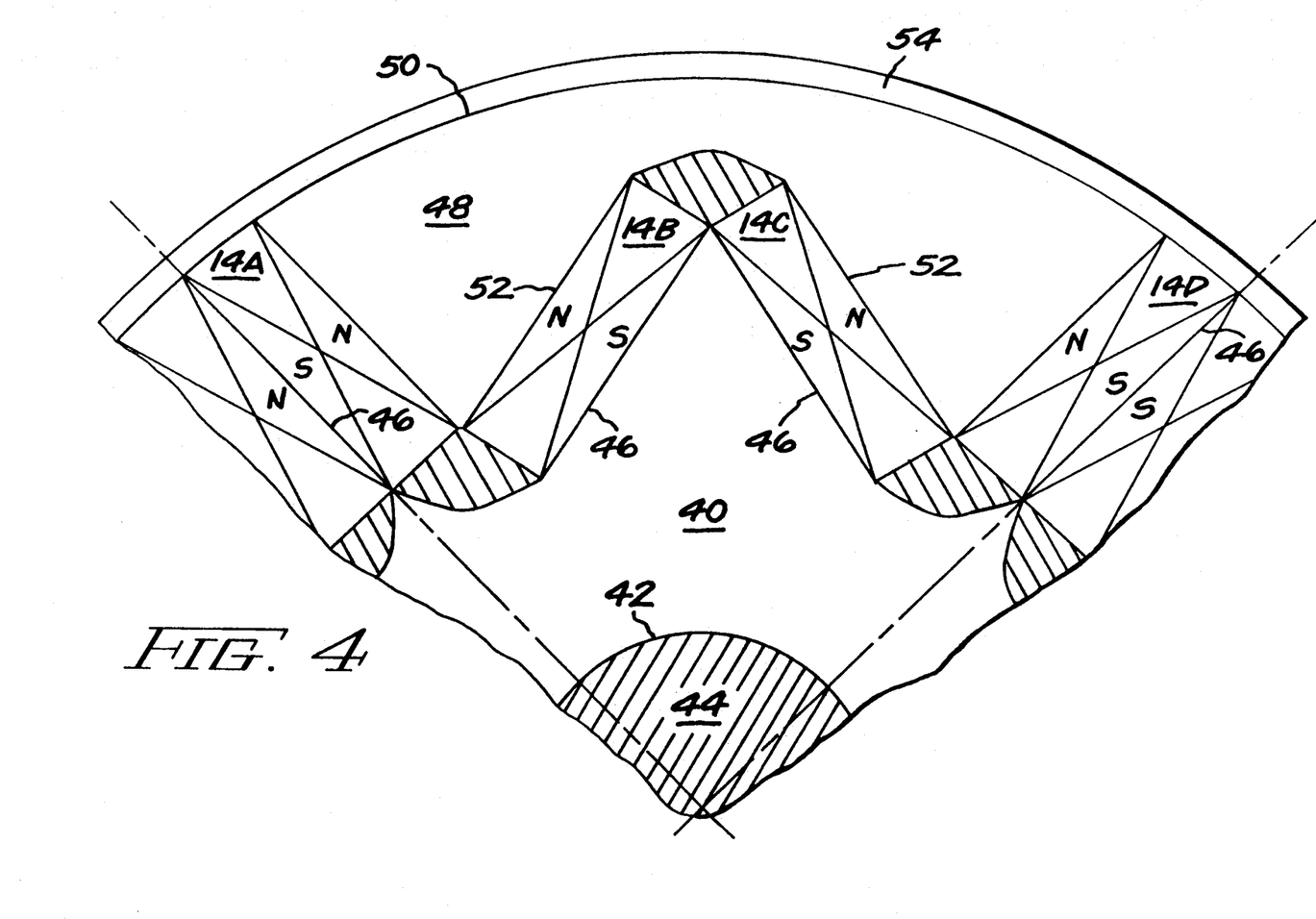
FIG. 4 is a view similar to that of FIG. 1 showing an alternative positioning of the magnets and a rotor core formed of an inner and an outer core section.

Another form of rotor assembly, illustrated in FIG. 4, allows the bridges 22 and ligaments 24, shown in FIG. 1, to be totally eliminated. In this embodiment, magnets 14A and 14D are simply butted up against one another. The two magnets 14B, 14C contact adjacent magnet sections only at corresponding corners. However, magnets 14A and 14D contact magnets of adjacent poles along their pole faces. In this embodiment, each lamination is made in separate sections. One of the lamination sections is an interior section 40 having a central aperture 42 for accepting a motor shaft 44. Interior section 40 has a star-like shape with a plurality of substantially planar land areas 46 against which magnets 14B and 14C are positioned when the laminations are stacked to form an internal rotor core. An external rotor core is formed from a plurality of sections of laminations 48, each having an outer arc-shaped edge 50 and an inner substantially W-shaped edge 52 for abutting against magnets 14B and 14C and being situated between magnets 14A and 14D. This external core is preferably formed in a number of sections equal to the number of rotor poles. In this arrangement, when the external core sections are brought into their assembled position against permanent magnets 14A–14D spaces 32 (shown in FIG. 1) between the magnets and adjacent lamination surfaces are eliminated. The assembly may be held together initially by glue or by use of a forming jig. Final assembly preferably incorporates a retaining shell 54 which is shrunk fit onto the assembled rotor to hold it together and to firmly retain the magnets. This shell may be a solid, thin, low electrical conductivity, high strength material such as Inconel alloy available from International Nickel Company or, to reduce electrical losses, may be applied as a tensioned wire wrap or formed of a nonconductor such as Kevlar polyaramide fiber, available from E. I. DuPont de Nemours and Co.

Figure 5A:
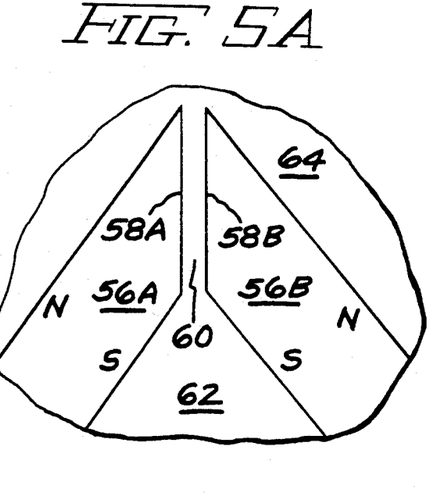
FIGS. 5A and and 5B illustrate use of mitered magnets in a rotor core section.
Figure 5B:
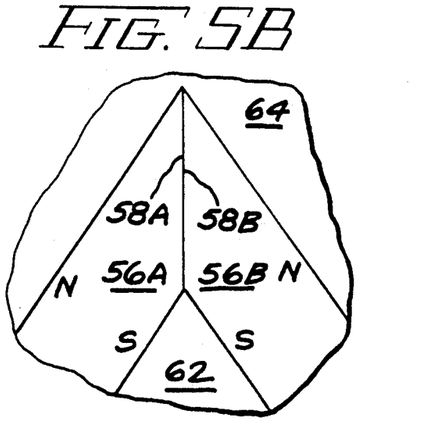
Figure 6A:
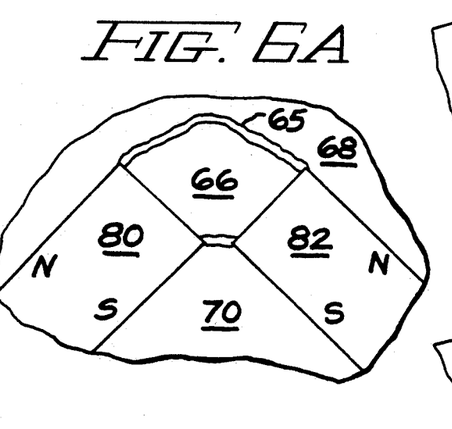
FIGS. 6A-6E illustrate alternative methods for utilizing non-magnetic inserts for increasing the strength of the rotor laminations and for connecting the inner and outer lamination sections.
Figure 6B:
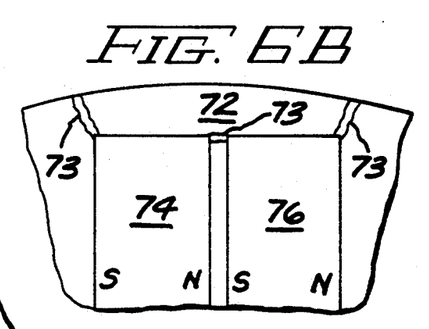
Figure 6C:
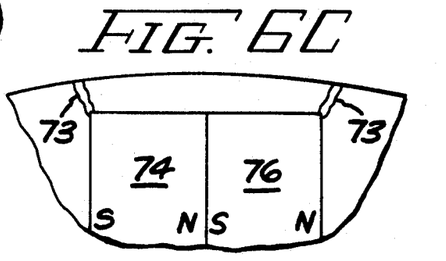
Figure 6D:
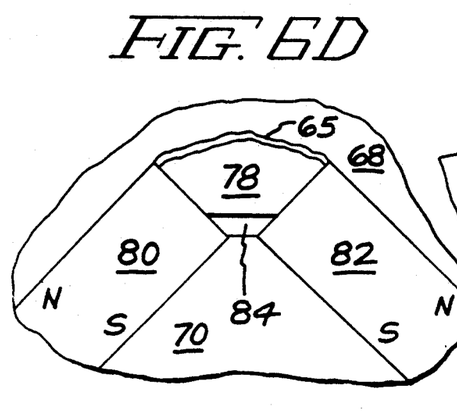
Figure 6E:
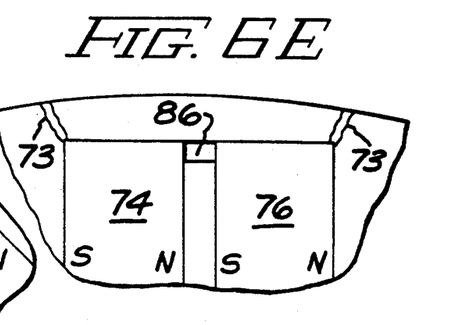

FIGS. 5A and 5B illustrate a rotor assembly method using custom machined magnets 56A, 56B which have mitered ends 58A, 58B in order to achieve maximum possible flux multiplication. The magnets may be used as shown in FIG. 5A, with ligaments 60 connecting interior and exterior sections 62, 64, respectively, of a rotor, or they may be used without ligaments if assembled by the method described with regard to FIG. 4.

Where higher strength than that of the magnetic material of the laminations is required for bridges and ligaments, composite laminations such as described in the aforementioned U.S. Pat. No. 4,916,346 may be used. FIG. 6A is a composite implementation of a rotor corresponding to that of FIG. 1. Space 20 of FIG. 1 is filled by a thin, nonmagnetic metal insert 66 which is welded, at regions 65, to the outer lamination portion 68 and to the inner lamination portion 70. FIG. 6B illustrates the result of welding an insert 72 over pole edge magnets 74, 76 at regions 73. FIG. 6C illustrates an arrangement alternative to that shown in FIG. 6B, in which pole edge magnets 74, 76 are abutting. FIG. 6D illustrates a construction in which an insert 78 is welded only to the external lamination section for center magnets 80, 82, leaving a gap 84 for flux control. FIG. 6E illustrates an arrangement similar to that of FIG. 6D but for the pole edge magnets 74, 76, which arrangement incorporates a gap 86.

Figure 7A:
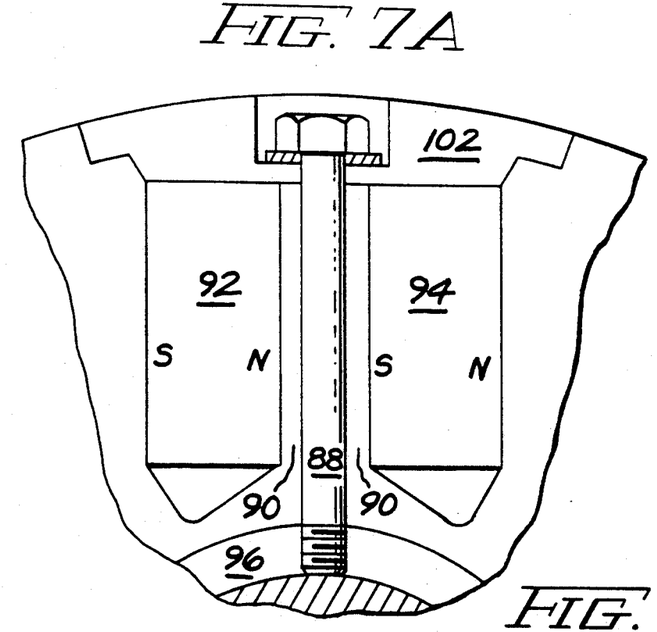
FIGS. 7A-7D illustrate alternative methods of connecting inner and outer core sections using bolts.
Figures 7B, 7C:
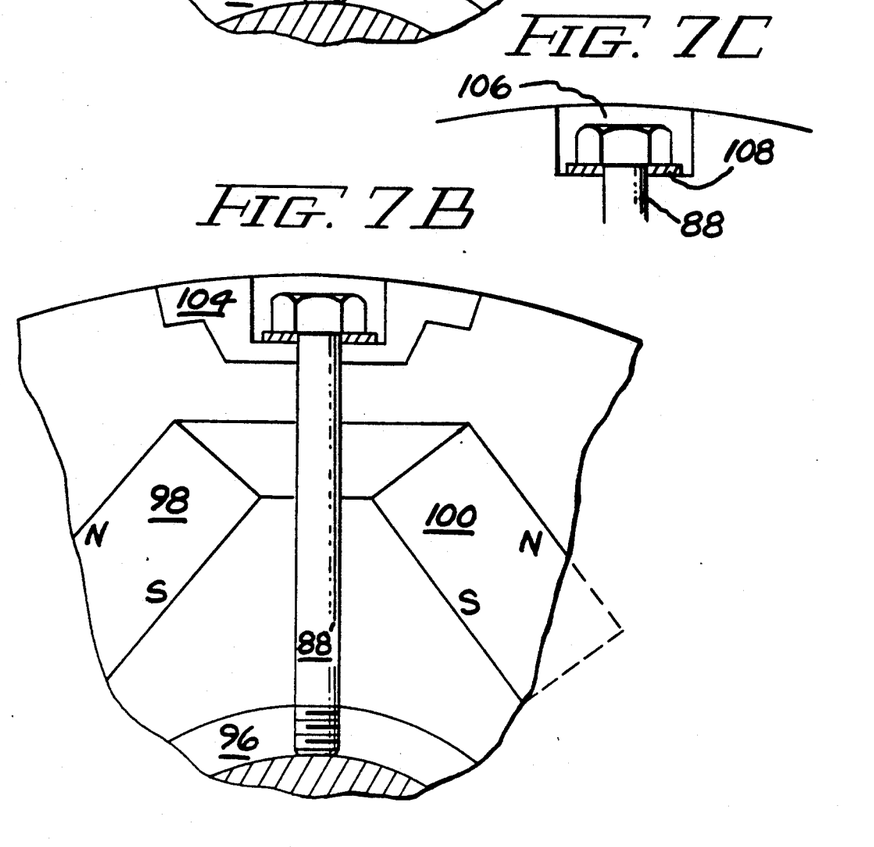
Figure 7D:
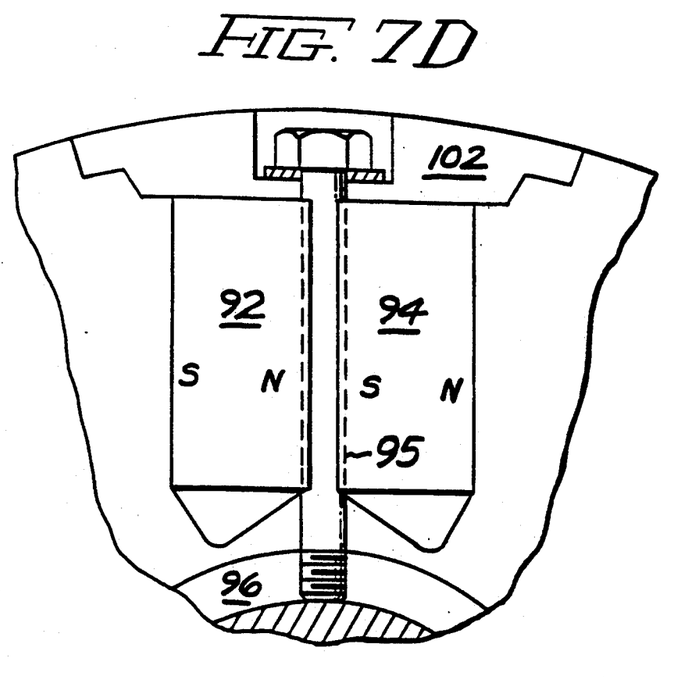

FIGS. 7A and 7B illustrate a rotor assembly in which the inner and outer portions may be bolted together, which assembly may be the most suitable one for very large size motors. Bolting, however, requires some major accommodations in the arrangement of the magnets. FIG. 7A illustrates how bolts 88 may be used at the edges of the rotor poles. A ligament 90 between magnets 92, 94 must now be expanded sufficiently to accept a through bolt. The expanded ligament 90 itself may be threaded or, preferably, bolt 88 may be extended into inner region 96 as shown. Region 96 may be laminated or, in cases where the air gap between rotor and stator is large and magnet thicknesses are large, especially in electronic drives or in line start motors, inner region 96 may be solid so as to provide a much more secure anchor for through bolts 88. Region 96 may be an inner cylinder on which the rotor laminations are stacked. An alternative to widening ligament 90 over its entire length is to form, grooves 95 in the magnets to accept the bolt at specific points such as illustrated in FIG. 7D. There is then a trade-off between using less magnet material overall and accepting degraded performance of part of the magnet. It may be necessary, in very large machines, to add a bolt 88' at the center of the rotor pole, as shown in FIG. 7B, to prevent excessive deflection of the outer portion of the rotor core at high speeds with consequent loosening of the magnets. Grooving of magnets 98, 100 may also be employed in the same manner as at the edges of the poles. In both the mid-pole and pole edge locations, inserts 102, 104 may be placed in preformed slots in the outer periphery of the rotor as shown in FIGS. 7A, 7B, respectively, to provide bearing surfaces for the bolts. Alternatively, as shown in FIG. 7C, a slot 106 may be included in several punched laminations or a hole may be bored in the assembled stack to accept a bolt head with only a washer 108 bearing directly on the laminations. Magnetic and nonmagnetic bolts 88 may be used to minimize the effects on the magnetic circuit, depending on the specific location. Bolts, whether longitudinal or radial, should always be insulated, at least at one end, to minimize circulating currents due to inverter chopping or slot harmonics.

Figure 8:
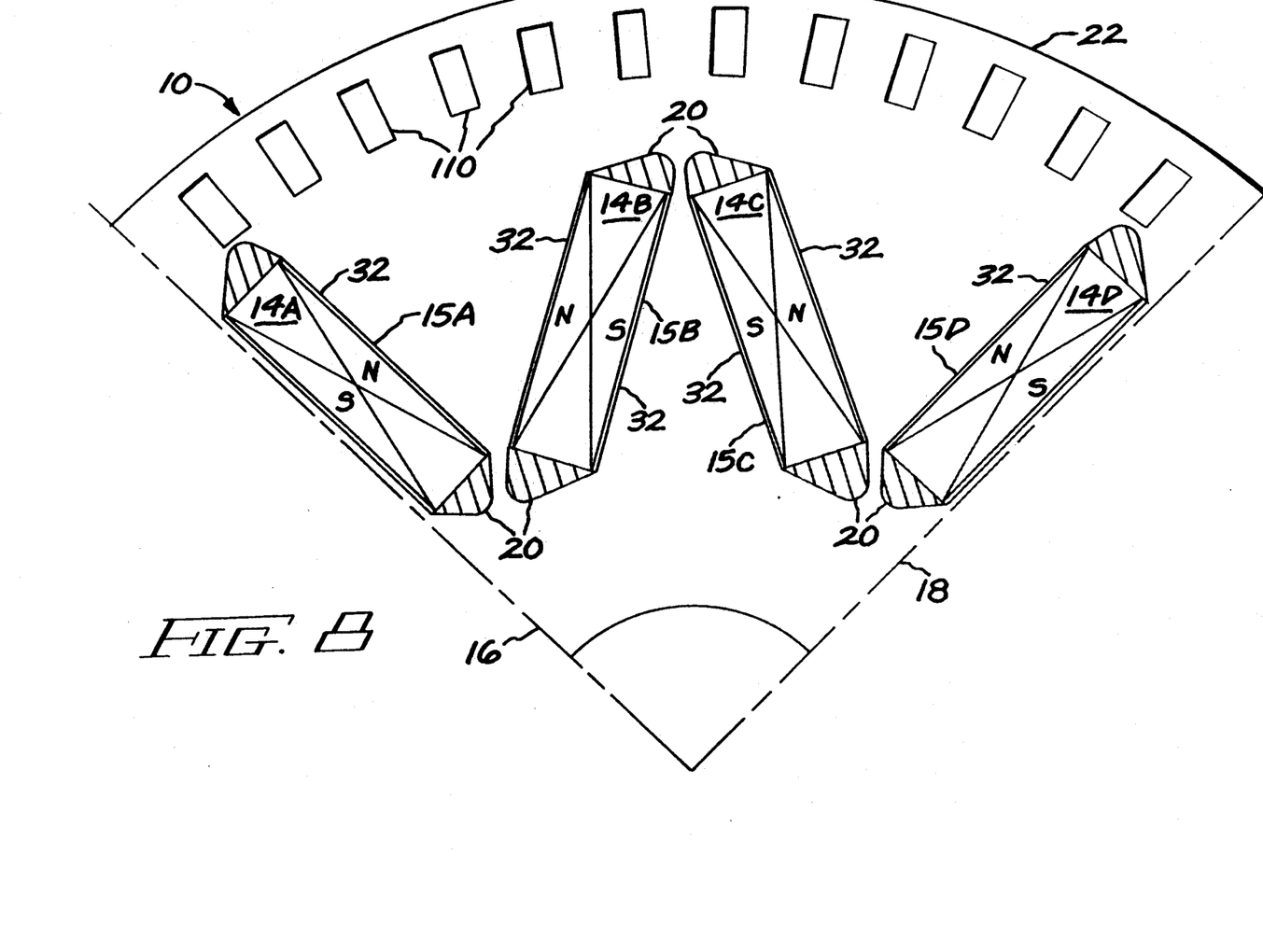
FIG. 8 illustrates the embodiment of FIG. 1 and includes radially outer slots forming a rotor cage for use in a line start motor.

The above discussion has focussed on rotors without cages. A cage for an IPM rotor comprises an array of slots, much like an induction motor, situated outboard of the permanent magnets. FIG. 8 is similar to FIG. 1 and illustrates an IPM rotor with a cage comprising slots 110. Such cages are required for line start motors to enable starting as an induction motor and delivery of torque at speeds up to synchronization, when the magnets become responsible for producing the torque. The cage then supplies stabilization against load transients, instabilities and hunting, and protects the magnets during the pole-slipping start mode. The cage is not normally needed in closed loop electronic drives except, perhaps, with current source inverters to ease commutation. All of the implementations described above apply, except that the tradeoffs become more difficult since the slots use up rotor material or "real estate" that would have been devoted to magnets, and the management of saturation and stress becomes more complex.

In permanent magnet motors of the type discussed herein, there is often no need to machine either the rotor outside diameter or the stator inside diameter since the rotor-stator air gaps are typically large compared to other motor types. This has the added advantage of eliminating problems resulting from lamination burrs or "smear" and work-hardening due to machining, and thus considerably reduces pole face and tooth tip losses. It is also possible to punch tapered poles as integral parts of the outer portions of the rotor laminations without affecting operation as described in any of the above discussion. Tapered poles may be desirable for reducing space harmonics to decrease both losses and noise, as well as for ameliorating pole tip and pole end tooth saturation.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An interior permanent magnet motor having a stator and a rotor, and a plurality of permanent magnets mounted within the rotor for establishing a preselected number of magnetic poles, each of the magnetic poles being defined by a preselected number of the permanent magnets arranged in a predetermined orientation and relationship with respect to others of the permanent magnets, each of the magnetic poles encompassing a preselected sector of the rotor with edges of each sector lying on a radius line of the rotor, each of the magnetic poles comprising:

first and second permanent magnets mounted within a rotor sector adjacent a respective radius line on opposite circumferential ends of the sector, each of said first and second permanent magnets having a magnetic north pole and a magnetic south pole, said first and second permanent magnets being oriented such that said magnetic poles lie in a plane parallel to the respective radius line; and at least a third and a fourth permanent magnet mounted within said rotor sector, each of said third and fourth permanent magnets being angularly oriented one toward the other such that a radially inner edge lies adjacent a respective one of the first and second permanent magnets and their radially outer edges are adjacent, the north and south polar faces of the magnets being commonly oriented to generate a net magnetic pole in a direction to establish a predetermined magnetic pole in the sector.

2. The motor of claim 1 wherein each of said magnets is positioned in a respective slot extending axially through the rotor, said magnets being held in position in said slots by a relatively rigid potting compound in said slots.

3. The motor of claim 2 wherein a plurality of apertures are formed in an axial direction through the rotor adjacent at least some of the magnets, said potting compound extending through each of the apertures.

4. The motor of claim 3 wherein at least the apertures on the radially outer side of the magnets are coupled to the magnet slots by passages extending therebetween.

5. The motor of claim 1 including a flat spring positioned in each of said slots, respectively, between a surface of a respective one of said magnets located in said slot and an adjacent inner surface of said slot, for compressively holding said magnets in said slots.

6. The motor of claim 5 wherein said flat spring comprises a brass sheet formed as a wavy spring.

7. The motor of claim 6 wherein said brass sheet is at about liquid nitrogen temperature and flattened to facilitate installation in said rotor.

8. The motor of claim 1 wherein each of said magnets abuts an adjacent one of said magnets along at least one axial contact line, said rotor comprising a radially inner portion coupled to a shaft of the motor and a radially outer portion, said magnets being positioned between said inner and outer portions with said slots being defined by spaces between said radially inner and outer portions.

9. The motor of claim 8 wherein said radially outer portion comprises a plurality of separate sectors, each of said separate sectors being associated with a respective one of said magnetic poles, said rotor including an outer ring positioned about said rotor in a clamping relationship for holding said radially outer portions of said rotor in compression against said magnets.

10. The motor of claim 1 wherein said radially outer edges of each of said third and fourth permanent magnets are mitered, said third and fourth permanent magnets being positioned such that said mitered edges are parallel to a radius line of said rotor.

11. The motor of claim 10 wherein said mitered edges are abutting, said rotor comprising a radially inner portion coupled to a shaft of the motor and a radially outer portion, said magnets being positioned between said radially inner and outer portions of said rotor with said slots being defined by spaces between said radially inner and outer portions.

12. The motor of claim 1 wherein said slots extend radially outward beyond a respective one of said magnets inserted in each of said slots, and further including a nonmagnetic weldable insert positioned in each of the extended portions of said slots, said inserts being welded to said rotor along all contacting surfaces therebetween to form a composite rotor structure.

13. The motor of claim 12 wherein said inserts only partially fill said extended position of said slots, said inserts being welded in contact with predetermined sections of said rotor and leaving an air gap between other sections of said rotor and said insert for flux control.

14. The motor of claim 1 and including a plurality of apertures extending radially through said rotor, each of said apertures terminating in a threaded portion adjacent the motor shaft, a corresponding plurality of bolts inserted one each into said apertures and threadedly engaging said threaded portion for holding said rotor against radial deflection during operation.

15. The motor of claim 14 wherein said rotor comprises a plurality of stacked laminations positioned about a radially inner solid cylinder, said threaded portion of said apertures being formed in said cylinder.

16. The motor of claim 15 wherein preselected ones of said magnets are formed with grooves for passing said bolts therethrough.

17. The motor of claim 8 including a plurality of apertures extending radially through said rotor, each of said apertures terminating in a threaded portion adjacent the motor shaft, and a corresponding plurality of bolts inserted one each into said apertures and threadedly engaging said threaded portion for holding said rotor against radial deflection during operation.

18. The motor of claim 1 wherein each of said magnets is positioned within axially-directed slots having a radial length greater than the width of said magnets for creating an area of nonmagnetic characteristics adjacent an edge of said magnets for preventing magnetic short circuiting of said magnets.

19. A rotor assembly for an internal permanent magnet rotor comprising:
a plurality of interior laminations stacked to form a substantially continuous internal core having a predetermined circumferential configuration defining a plurality of substantially planar land areas;
a plurality of permanent magnets positioned on the land areas of the internal core, the magnets being arranged in preselected groups for establishing a corresponding preselected number of magnetic poles, each of the preselected groups comprising a plurality of angularly-oriented magnets forming at least one substantially W-shaped arrangement;
a plurality of external laminations stacked to form a substantially continuous external core surrounding the internal core having a plurality of internal land areas for mating with external surfaces of each of the magnets when the external core is assembled onto the internal core and magnets; and
a circumferential band encompassing the external core for holding the external core in its assembled position on the internal core and magnets.

20. The rotor assembly of claim 19 wherein the external core comprises a plurality of core sectors, each of the core sectors corresponding to one of the magnetic poles, the circumferential band holding the core sectors in their respective assembled relationship on the internal core and magnets.

21. A rotor assembly for an internal permanent magnet rotor comprising;
a plurality of interior laminations stacked to form a substantially continuous internal core having a predetermined circumferential configuration defining a plurality of substantially planar land area;
a plurality of permanent magnets positioned on the land areas of the internal core, the magnets being arranged in preselected groups for establishing a corresponding preselected number of magnetic poles, each of the preselected groups comprising a plurality of angularly-oriented magnets forming at least one substantially W-shaped arrangement;

a plurality of external laminations stacked to form a substantially continuous external core surrounding the internal core having a plurality of internal land areas for mating with external surfaces of each of the magnets when the external core is assembled onto the internal core and magnets; and a plurality of lamination ligaments extending from each interior lamination to a corresponding one of the external laminations for coupling the internal core to the external core, the ligaments extending through circumferential spaces between adjacent ones of the magnets.

22. The rotor assembly of claim 21 wherein the magnets fit loosely in axially-extending slots defined by spacing between the internal and external cores and the connecting ligaments, the magnets being held in fixed positions within the slots by a potting compound inserted therein.

23. The rotor assembly of claim 22 wherein the potting compound comprises a relatively low melting point, nonmagnetic metal.

24. The rotor assembly of claim 23 including a plurality of axially-extending apertures through the internal and external cores adjacent preselected ones of the magnets, the apertures being filled with the potting compound for enhancing axial strength of the rotor assembly 25. The rotor assembly of claim 24 wherein at least some of the axially-extending apertures are coupled to the slots containing the magnets by passages therebetween.

26. The rotor assembly of claim 23 and further including a plurality of uniformly circumferentially-spaced, axially-extending apertures adjacent an outer circumference of the external core, each of the apertures being filled with the metal whereby the rotor assembly is adaptable for use in a line start motor.

27. A rotor assembly for an internal permanent magnet rotor comprising:

a plurality of interior laminations stacked to form a substantially continuous internal core having a predetermined configuration defining a plurality of substantially planar land areas;

a plurality of permanent magnets positioned on the land areas of the internal core, the magnets being arranged in preselected groups for establishing a corresponding preselected number of magnetic poles, each of the preselected groups comprising a plurality of angularly-oriented magnets forming at least one substantially W-shaped arrangement;

a plurality of external laminations stacked to form a substantially continuous external core surrounding the internal core having a plurality of internal land areas for mating with external surfaces of each of the magnets when the external core is assembled onto the internal core and magnets;

a plurality of apertures formed radially through the external core and aligned with spaces between adjacent ones of the magnets;

a plurality of apertures formed in the internal core and terminating at a preselected inner radius in a threaded portion, the apertures in the internal core being aligned with the apertures in the external core; and a plurality of bolts extending through the internal core apertures and threadedly engaging the threaded portion in the internal core for holding the external core in its assembled position in the internal core with the magnets therebetween.

28. The rotor assembly of claim 27 including a substantially solid inner cylinder within the interior laminations, the threaded portion of the apertures being formed in the inner cylinder.

29. A permanent magnet rotor for a dynamoelectric machine comprising:

a core having a centerline axis and including a pair of generally opposite end faces, and an outer circumferential surface defined about the centerline axis and interposed between said opposite end faces; and a set of magnetic poles defined in said core, each magnetic pole being defined between a pair of adjacent imaginary planes extending generally radially and in angular relation from the centerline axis and each magnetic pole including a pair of sets of permanent magnets extending generally axially of said core between said opposite end faces, at least two permanent magnets of one of said permanent magnet sets respectively having pole faces disposed at least adjacent the adjacent imaginary planes of said each magnetic pole and extending in generally parallel relation therewith, and at least another two permanent magnets of another of said permanent magnet sets being angularly oriented with respect to each other and spaced between said at least two permanent magnets of said one of said permanent magnet sets, said at least another two permanent magnets in their angular orientation being spaced closest together adjacent said outer circumferential surface.

* * * * *